US008406556B2

(12) United States Patent
Wang et al.

(10) Patent No.: US 8,406,556 B2
(45) Date of Patent: Mar. 26, 2013

(54) LIGHT TRANSPORT RECONSTRUCTION FROM SPARSELY CAPTURED IMAGES

(75) Inventors: Jiaping Wang, Beijing (CN); Yue Dong, Beijing (CN); Xin Tong, Beijing (CN); Zhouchen Lin, Beijing (CN); Baining Guo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 12/797,859

(22) Filed: Jun. 10, 2010

(65) Prior Publication Data

US 2011/0304745 A1 Dec. 15, 2011

(51) Int. Cl.
*G06K 9/40* (2006.01)
(52) U.S. Cl. ...... 382/274; 382/276; 345/589; 348/229.1
(58) Field of Classification Search .................. None
See application file for complete search history.

(56) References Cited

U.S. PATENT DOCUMENTS

| 5,168,375 | A | 12/1992 | Reisch |
| 6,064,073 | A | 5/2000 | Hoogenraad |
| 7,218,324 | B2 | 5/2007 | Pfister |
| 2006/0271532 | A1 | 11/2006 | Selvaraj |
| 2007/0171381 | A1 | 7/2007 | Tan |
| 2007/0217676 | A1* | 9/2007 | Grauman et al. ............. 382/170 |
| 2008/0150938 | A1 | 6/2008 | Pantaleoni |
| 2008/0174704 | A1* | 7/2008 | Tan et al. ...................... 348/745 |

OTHER PUBLICATIONS

Petros Drineas, On the Nystrom Method for Approximating a Gram Matrix for Improved Kernel-Based Learning, JMLR 2005.*

An, X., F. Pellacini, AppProp: All-pairs appearance-space edit propagation, ACM Trans. Graph., Aug. 2008, pp. 1-10, vol. 27, No. 3.
Chuang, Y.-Y., D. E. Zongker, J. Hindorff, B. Curless, D. Salesin, R. Szeliski, Environment matting extensions: Towards higher accuracy and real-time capture, Proc. of the 27th Annual Conf. on Comp. Graphics, SIGGRAPH 2000, Jul. 23-28, 2000, pp. 121-130, New Orleans, Louisiana, USA.
Debevec, P. E., J. Malik, Recovering high dynamic range radiance maps from photographs, Proc. of the 24th Annual Conf. on Comp. Graphics, SIGGRAPH 1997, Aug. 3-8, 1997, pp. 369-378, Los Angeles, CA, USA.
Debevec, P. E., T. Hawkins, C. Tchou, H.-P. Duiker, W. Sarokin, M. Sagar, Acquiring the reflectance field of a human face, Proc. of the 27th Annual Conf. on Comp. Graphics, SIGGRAPH 2000, Jul. 23-28, 2000, pp. 145-156, New Orleans, Louisiana, USA.

(Continued)

*Primary Examiner* — Chan S Park
*Assistant Examiner* — Mark Roz
(74) *Attorney, Agent, or Firm* — Lyon & Harr, LLP; Mark A. Watson

(57) ABSTRACT

A "Scene Re-Lighter" provides various techniques for using an automatically reconstructed light transport matrix derived from a sparse sampling of images to provide various combinations of complex light transport effects in images, including caustics, complex occlusions, inter-reflections, subsurface scattering, etc. More specifically, the Scene Re-Lighter reconstructs the light transport matrix from a relatively small number of acquired images using a "Kernel Nyström" based technique adapted for low rank matrices constructed from sparsely sampled images. A "light transport kernel" is incorporated into the Nyström method to exploit nonlinear coherence in the light transport matrix. Further, an adaptive process is used to efficiently capture the sparsely sampled images from a scene. The Scene Re-Lighter is capable of achieving good reconstruction of the light transport matrix with only few hundred images to produce high quality relighting results. Further, the Scene Re-Lighter is also effective for modeling scenes with complex lighting effects and occlusions.

20 Claims, 5 Drawing Sheets

OTHER PUBLICATIONS

Fazel, M., Matrix rank minimization with applications, Ph.D Thesis, Elec. Eng. Dept, Stanford University, Mar. 2002, pp. 1-130.

Fuchs, M., V. Blanz, H. P. A. Lensch, H.-P. Seidel, Adaptive sampling of reflectance fields, ACM Trans. Graph., Jun. 2007, pp. 1-18, vol. 26, No. 2.

Garg, G., E.-V. Talvala, M. Levoy, H. P. A. Lensch, Symmetric photography: Exploiting data-sparseness in reflectance fields, Proc. of the Eurographics Symposium on Rendering Techniques, Jun. 26, 2006, pp. 251-262, Nicosia, Cyprus.

Giforos, J., E. Longmire, I. Marusic, N. Hutchins, N. Papanikolopoulos, Spectral clustering for identifying coherent eddy structure in turbulent boundary layers, Int'l Conf. on Intelligent Sys's and Computing, Jul. 6-7, 2006, pp. 1-6, Ayia Napa, Cyprus.

Goesele, M., H. P. A. Lensch, J. Lang, C. Fuchs, H.-P. Seidel, DISCO: Acquisition of translucent objects, ACM Trans. Graph., Aug. 2004, pp. 835-844, vol. 23, No. 3.

Goreinov, S. A., E. E. Tyrtyshnikov, N. L. Zamarashkin, A theory of pseudo-skeleton approximations, Linear Algebra and its Applications, Aug. 1997, pp. 1-21, vol. 261.

Hasan, M., F. Pellacini, K. Bala, Matrix row-column sampling for the many-light problem, ACM Trans. Graph., Jul. 2007, pp. 1-10, vol. 26, No. 3.

Hasan, M., E. Velázquez-Armendáriz, F. Pellacini, K. Bala, Tensor clustering for rendering many-light animations, Eurographics Symposium on Rendering, Jun. 2008, pp. 1105-1114, No. 27, vol. 4.

Hawkins, T., P. Einarsson, P. E. Debevec, A dual light stage, Proc. of the Eurographics Symposium on Rendering Techniques, Jun. 29-Jul. 1, 2005, pp. 91-98, Konstanz, Germany.

Levoy, M., P. Hanrahan, Light field rendering, Proc. of the 23rd Annual Conf. on Comp. Graphics, SIGGRAPH 1996, Aug. 4-9, 1996, pp. 31-42, New Orleans, LA, USA.

Lin, Z., T.-T. Wong, H.-Y. Shum, Relighting with the reflected irradiance field: Representation, sampling and reconstruction, Int'l J. of Comp. Vision, Sep.-Oct. 2002, pp. 229-246, vol. 49, No. 2-3.

Mahajan, D., I. Kemelmacher-Shlizerman, R. Ramamoorthi, P. N. Belhumeur, A theory of locally low dimensional light transport, ACM Trans. Graph., Jul. 2007, pp. 62-1-62-10, vol. 26, No. 3.

Masselus, V., P. Peers, P. Dutré, Y. D. Willems, Relighting with 4D incident light fields, ACM Trans. Graph., Jul. 2003, pp. 613-620, vol. 22, No. 3.

Masselus, V., P. Peers, P. Dutré, Y. D. Willems, Smooth reconstruction and compact representation of reflectance functions for image-based relighting, 15th Eurographics Workshop on Rendering, Jun. 21-23, 2004, pp. 287-298, Norköping, Sweden.

Matusik, W., H. Pfister, A. Ngan, P. A. Beardsley, R. Ziegler, L. McMillan, Image-based 3D photography using opacity hulls, ACM Trans. Graph., Jul. 23-26, 2002, pp. 427-437, vol. 21, No. 3, San Antonio, TX.

Matusik, W., M. Loper, H. Pfister, Progressively-refined reflectance functions from natural Illumination, 15th Eurographics Workshop on Rendering, Jun. 21-23, 2004, pp. 299-308, Norköping, Sweden.

Ng, R., R. Ramamoorthi, P. Hanrahan, All-frequency shadows using non-linear wavelet lighting approximation, ACM Trans. Graph., Jul. 2003, pp. 376-381, vol. 22, No. 3.

Peers, P., P. Dutré, Inferring reflectance functions from wavelet noise, Proc. of the Eurographics Symposium on Rendering Techniques, Jun. 29-Jul. 1, 2005, pp. 173-182, Konstanz, Germany.

Peers, P., K. vom Berge, W. Matusik, R. Ramamoorthi, J. Lawrence, S. Rusinkiewicz, P. Dutré, A compact factored representation of heterogeneous subsurface scattering, ACM Trans. Graph., Jul. 2006, vol. 25, No. 3, pp. 746-753.

Peers, P., D. K. Mahajan, B. Lamond, A. Ghosh, W. Matusik, R. Ramamoorthi, P. Debevec, Compressive light transport sensing, J. of the ACM Transactions on Graphics, Jan. 2009, vol. 28, No. 1, ACM New York, NY, USA.

Platt, J. C., FastMap, MetricMap, and Landmark MDS are all Nystrom algorithms, Microsoft Research, Tech Report, MSR-TR-2004-26, Jan. 2005, pp. 1-15.

Sen, P., S. Darabi, Compressive dual photography, Proc. of Eurographics, Comput. Graph. Forum, Apr. 2009, pp. 609-618, vol. 28, No. 2.

Sen, P., B. Chen, G. Garg, S. R. Marschner, M. Horowitz, M. Levoy, H. P. A. Lensch, Dual photography, Proc. of the ACM Trans. Graph., Jul. 2005, pp. 745-755, vol. 24, No. 3.

Wang, J., Y. Dong, X. Tong, Z. Lin, B. Guo, Kernel Nyström method for light transport, ACM Trans. Graph., Aug. 2009, vol. 28, No. 3.

Wenger, A., A. Gardner, C. Tchou, J. Unger, T. Hawkins, P. E. Debevec, Performance relighting and reflectance transformation with time-multiplexed illumination, ACM Trans. Graph., Jul. 2005, pp. 756-764, vol. 24, No. 3.

Williams, C. K. I., M. Seeger, Using the Nyström method to speed up kernel machines, Advances in Neural Information Processing Systems, NIPS 2000, Dec. 2001, pp. 682-688, Vancouver, British Columbia, Canada.

\* cited by examiner

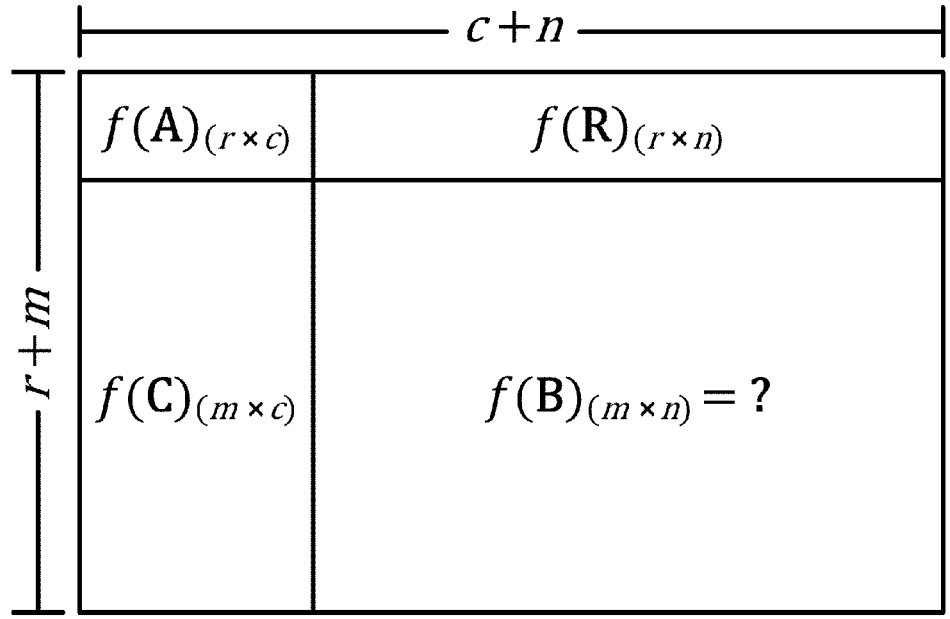

Submatrix [ A, R ] (i.e., sparsely sampled rows) and submatrix [ A, C ] (i.e., sparsely sampled columns) are automatically constructed using an automated image capture process. Missing submatrix B is reconstructed by the "Scene Re-Lighter" using a "Kernel Nyström" process that ultimately results in reconstruction of the light transport matrix T from submatrices A, R, C and B. In other words, using an automatically estimated light transport kernel $f$, the "Kernel Nyström" process approximates $f(\mathbf{B})$ by the matrix multiplications of $f(\mathbf{C})$, $f(\mathbf{R})$, and the pseudo-inverse of $f(\mathbf{A})$, where $f(\mathbf{B}) \approx f(\mathbf{C}) \cdot f(\mathbf{A})^+ \cdot f(\mathbf{R})$. Submatrix B is then obtained using the inverse of the light transport kernal (i.e., $f^{-1}$). The final light transport matrix T is then constructed from submatrices A, R, C and B. Note that in the case that $(r+m) = (c+n)$, the matrix T is *symmetric*, otherwise, the matrix T is *asymmetric*. The "Scene Re-Lighter" is fully capable of handling either case.

FIG. 3

Exemplary dual camera setup for capturing sparse rows and columns of submatrices [ A, R ] and [ A, C ] (See FIG. 3) from a scene for automatically reconstructing a corresponding light transport matrix.

LIGHT TRANSPORT RECONSTRUCTION FROM SPARSELY CAPTURED IMAGES

BACKGROUND

1. Technical Field

A "Scene Re-Lighter" provides various techniques for relighting sparsely captured images, and in particular, various techniques for using an automatically reconstructed light transport matrix to provide various combinations of complex light transport effects in images, including caustics, complex occlusions, inter-reflections, subsurface scattering, etc.

2. Related Art

Image-based relighting offers an unparalleled advantage of realistic rendering without scene modeling, which is often an arduous task. However, to generate high quality results, conventional relighting techniques typically require tens of thousands of images for accurate reconstruction of a "light transport matrix" (i.e., matrix T). Several conventional approaches have attempted to reduce the number of required images. Unfortunately, these techniques either are dedicated to specific light transport effects, or are primarily effective with scenes of simple geometry configurations. Consequently, applying such techniques to scenes with complex lighting effects, occlusions, and/or complex geometries still requires a large number of input images and computationally expensive light transport matrix reconstruction methods.

As is well known to those skilled in the art, the idea behind image-based relighting is to directly capture the "light transport" of a real-world scene so that it can be rendered with new illumination. Mathematically, image-based relighting can be formulated as the following equation:

$$b = T \cdot l \qquad \text{Equation (1)}$$

where T is an m×n light transport matrix that describes the light transport from n light sources to m camera pixels, l is the illumination condition represented by a vector of incident radiance from n light sources, and b is the outgoing radiance observed in a camera image with m pixels. Hence, image-based relighting often focuses on constructing or recovering the matrix T, which can then be used to provide a variety of lighting effects.

In general, the light transport matrix T represents discrete samples of the reflectance field. Conventionally, a complete 8D reflectance field, which describes the light transport from the incident light field to the outgoing light field, is difficult to capture and process. Therefore, most existing methods consider simplified 4D and 6D reflectance fields instead of the more complex 8D reflectance field.

Conventional light transport acquisition methods can be generally categorized into one of three basic classes: brute force, sparsity based, and coherence based methods.

The brute force methods capture very large numbers of images to directly measure the light transport matrix from the scene, where each column is an image of the scene lit by a single light source in the incident light domain. One such technique uses a "light stage device" for capturing 4D reflectance fields for a fixed viewpoint and distant lighting by moving a point light source around the object. A related technique exploits the well-known "Helmholtz reciprocity" to capture the reflectance field of highly reflective objects. To obtain dense samples in the incident light domain, rows of the light transport matrix are captured by shooting rays from the viewpoint and capturing high-resolution images of the scene projected over the incident light domain. Reciprocity is also exploited to acquire 6D reflectance fields. Unfortunately, all of these methods require tens of thousands of images for modeling a high quality light transport matrix.

The sparsity based methods model the light transport matrix with a set of basis functions defined over the incident light domain and assume that each row of the light transport matrix can be approximated by a linear combination of a sparse set of basis functions. Thus, the light transport matrix can be reconstructed by deriving the sparse basis and their weights for each row from a set of images captured under specific lighting conditions. "Environment matting" models the reflectance of specular or refractive objects by representing the light transport of each pixel (i.e., a row of transport matrix) with a single 2D box function.

Such techniques have been extended for modeling glossy objects by replacing the box function with an oriented Gaussian kernel. A related technique models the light transport matrix with hierarchical rectangular basis functions. Further, an adaptive algorithm is used to derive the sparse basis and their weights for each pixel from images of the scene captured under various natural illumination conditions. Another of these techniques operates by modeling the light transport matrix with wavelets and inferring the light transport matrix from images of the scene illuminated by carefully designed wavelet noise patterns. Both approaches apply a greedy strategy to find a suboptimal sparse basis for each pixel, which only works well for scenes with simple occlusions. Yet another technique uses a compressive sensing approach that computes the solution for each pixel from images captured from a scene illuminated by patterned lighting. However, the number of images needed for reconstruction depends on both the row length and the number of basis used for each row, which becomes quite large for scenes with complex occlusions. The reconstruction process is also computationally expensive and time consuming.

Coherence based methods acquire the light transport matrix by exploiting the coherence of reflectance field data. One such technique is based on the interpolation and compression of the reflectance field. Another coherence based technique uses an adaptive sampling scheme for sampling the 4D reflectance field. The spatial coherence of the reflectance field in the incident domain is exploited for accelerating the acquisition process. Starting from a set of images taken with a sparse set of regularly distributed lighting directions, the algorithm analyzes observed data and then captures more images in each iteration with the new lighting directions where the reflectance field is not smooth. Note that the smoothness of reflectance data among neighboring pixels is also exploited in various coherence-based techniques for improving the result quality.

In addition to the reconstruction of low rank symmetric matrices, the Nyström method is also widely used in the machine learning community for approximately computing the eigenvalues and eigenvectors of a symmetric matrix from sparse matrix samples. For example, one conventional Nyström-based technique addresses asymmetric matrices by using a "pseudo-skeleton approximation" for reconstructing a complete matrix from a sparse collection of its rows and columns. In graphics research, another Nyström-based technique is used to accelerate appearance edit propagation by approximating the dense symmetric distance matrix with sparsely sampled rows and columns.

Similar techniques have been used to efficiently render synthetic scenes. In this approach, columns of the matrix are clustered in a small number of groups according to their values in the sparsely sampled rows. A representative column for each group is then sampled and weighted for approximating other columns in the same group. However, this approach only uses the coherence between the columns for approximating the matrix. Coherence between the rows is not exploited. Moreover, applying this approach to the light transport matrix for use in relighting applications has been observed to generate temporal artifacts under animated light.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Scene Re-Lighter," as described herein, provides various techniques for using an automatically reconstructed light transport matrix (i.e., matrix T) derived from a sparse sampling of images to provide various combinations of complex light transport effects in images, including caustics, complex occlusions, inter-reflections, subsurface scattering, etc. Further, the Scene Re-Lighter is also effective for modeling scenes with complex lighting effects and occlusions.

Advantageously, the number of images needed for reconstruction of the light transport matrix is proportional to the rank of the light transport matrix and is independent on the size of the matrix. Consequently, unlike conventional light transport matrix reconstruction methods that can require many thousands of images, the Scene Re-Lighter achieves good reconstruction of the light transport matrix with only a few hundred automatically captured images. In other words, the Scene Re-Lighter reconstructs the light transport matrix T from a sparse matrix created from a set of sparsely sampled images of a scene. Further, in various embodiments, the Scene Re-Lighter makes use of "dual-photography" image capture setup (comprising a primary camera directly capturing images of a scene and a secondary camera capturing images of a diffuser positioned relative the scene) to capture the required information for constructing the initial sparse matrix from a real scene. Moreover, the reconstruction algorithm employed by the Scene Re-Lighter can be represented as a set of matrix operations, which is simple and fast, thereby significantly reducing computational overhead relative to conventional relighting techniques.

In contrast to conventional sparsity based relighting approaches, the Scene Re-Lighter fully exploits coherence in the light transport matrix for reconstruction purposes. Further, in contrast to conventional coherence based relighting techniques that only exploit the coherence in either rows or columns, the Scene Re-Lighter exploits data coherence in the entire light transport matrix (i.e., both rows and columns) for reconstruction. In addition, since the Scene Re-Lighter makes no assumptions about the smoothness of the sampled reflectance field, it is capable of handling sharp variations of the light transport, such as shadows, caustics, and surface textures, or combinations of such relighting effects.

More specifically, the Scene Re-Lighter uses a "Kernel Nyström" method for reconstructing the light transport matrix from a relatively small number of acquired images. Conventional Nyström-based matrix reconstruction techniques are applicable to reconstruction of low rank symmetric matrices. However, the Scene Re-Lighter has extended such conventional Nyström-based matrix reconstruction techniques to provide a generalized form of the Nyström method that is applicable to asymmetric matrices such as the light transport matrix T. The Scene Re-Lighter further introduces the concept of a "light transport kernel" that is incorporated into the modified Nyström method (hence the use of the term "Kernel Nyström" method) to further exploit the nonlinear coherence of the light transport matrix.

Note that the light transport matrix reconstructed by the Scene Re-Lighter is unique to the particular scene being captured, and to particular materials exhibiting a variety of different light transport effects in the scene being captured. For example, a "caustics" type scene generally includes a set of one or more transparent objects, where the light transport is dominated by caustics created by light refraction. In a "shadow" type scene, the geometry of one or more particular elements of the scene often results in complex occlusions that tend to produce detailed shadows. An "inter-reflection" type scene is designed to illustrate inter-reflections between different objects (such as, for example, reflective colored metallic balls) in combination with color bleeding effects. In a "combination" type scene, objects with different material properties are placed together and present a mixture of different light transport effects, including reflection, refraction, shadows, and inter-reflections, subsurface scattering, and caustics. In other words, it should be clear that the Scene Re-Lighter is capable of reconstructing a light transport matrix for scenes of any complexity, and including materials having any variety of light transport effects.

In view of the above summary, it is clear that the Scene Re-Lighter described herein provides various techniques for using an automatically reconstructed light transport matrix derived from sparsely sampled images to provide various combinations of complex light transport effects in images, including caustics, complex occlusions, inter-reflections, subsurface scattering, etc. In addition to the just described benefits, other advantages of the Scene Re-Lighter will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
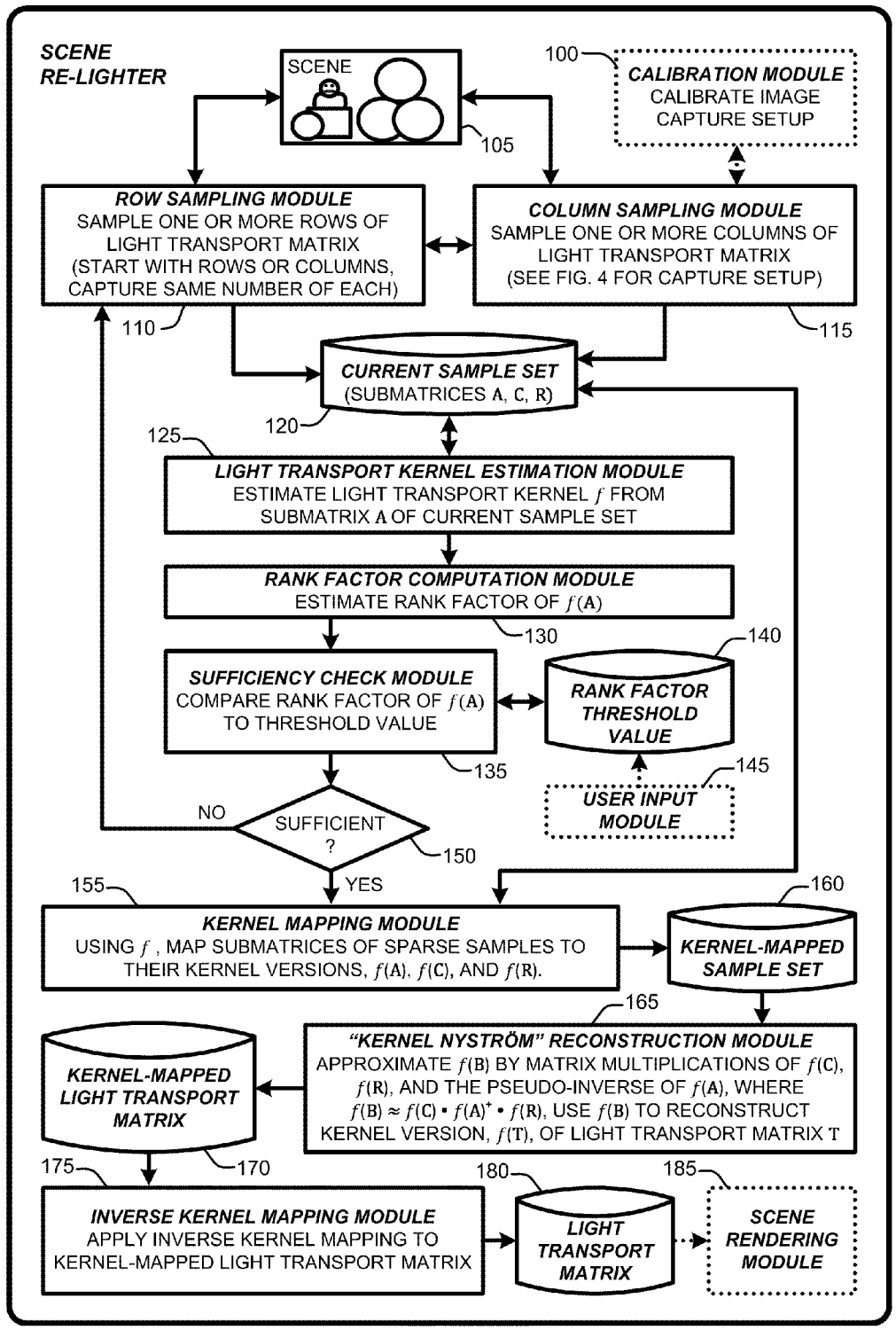
FIG. 1 provides an exemplary architectural flow diagram that illustrates program modules for implementing various embodiments of the Scene Re-Lighter, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Scene Re-Lighter," as described herein, provides various techniques for using an automatically reconstructed light transport matrix (i.e., matrix T) derived from sparsely sampled images to provide various combinations of complex light transport effects in images, including caustics, complex occlusions, inter-reflections, subsurface scattering, etc. Further, the Scene Re-Lighter is also effective for modeling scenes with complex lighting effects and occlusions. The Scene Re-Lighter focuses on 4D reflectance fields with a fixed viewpoint and point light sources that lie in a 2D plane to reconstruct a light transport matrix for a scene. The light transport matrix is reconstructed from a relatively small number of acquired images using a Nyström based matrix reconstruction technique that is adapted to low rank matrices constructed from sparsely sampled images.

Further, in various embodiments, an automated adaptive image capture process, as described herein, is used to efficiently capture a sparse sampling of images of the scene. In fact, using the light transport matrix reconstruction techniques described herein, the number of images needed for reconstruction of the light transport matrix is proportional to the rank of the light transport matrix and is independent of the size of the matrix. Consequently, in contrast to conventional light transport matrix reconstruction methods that can require many thousands of images, the Scene Re-Lighter is capable of achieving good reconstruction of the light transport matrix with only a few hundred automatically captured images to produce high quality relighting results. Moreover, the reconstruction algorithm employed by the Scene Re-Lighter can be represented as a set of matrix operations, which is simple and fast, thereby significantly reducing computational overhead relative to conventional relighting techniques.

More specifically, the Scene Re-Lighter uses a process described herein as a "Kernel Nyström" method for reconstructing the light transport matrix from a small number of images (i.e., an initial sparse matrix constructed from sparse sampling of images of a scene). Conventional Nyström-based matrix reconstruction techniques are applicable to reconstruction of low rank symmetric matrices. Consequently, since the light transport matrix is generally not symmetric, conventional Nyström-based matrix reconstruction techniques are not very useful for recovering the light transport matrix. However, the Scene Re-Lighter has extended such conventional Nyström-based matrix reconstruction techniques to provide a generalized form of the Nyström method that, while still being useful for symmetric matrix reconstruction, is also applicable to asymmetric matrices such as the light transport matrix T. It should also be understood that this extension to the conventional Nyström method, as described herein, is generally applicable for use in the reconstruction of either symmetric or asymmetric matrices other than the light transport matrix T.

In general, the Scene Re-Lighter uses the Kernel Nyström techniques described herein by first acquiring a small number rows and columns of the light transport matrix from the scene, transforming these sparse samples via an automatically estimated "light transport kernel" and then reconstructing the entire matrix based on the transformed sparse samples.

As noted above, the Scene Re-Lighter introduces the concept of a "light transport kernel" that is incorporated into the modified Nyström method (hence the use of the term "Kernel Nyström" method). This light transport kernel exploits non-linear coherence of the light transport matrix. By exploiting nonlinear coherence in the light transport matrix, the Kernel Nyström method significantly enhances the power of the conventional Nyström method and reduces the number of sampled rows and columns (and hence acquired images) needed for the matrix reconstruction.

In general, the light transport kernel is used as follows. First, a data specific kernel function is designed that can be estimated from the sparse row and column samples. By mapping these samples with the kernel function, the rank of the light transport matrix is reduced so that a high quality matrix can be reconstructed from kernel-mapped sparse samples via the newly extended Nyström method. The final light transport matrix is then obtained from elements of the reconstructed matrix by inverse kernel mapping.

Note that the light transport matrix reconstructed by the Scene Re-Lighter is unique to the particular scene being captured, and to particular materials exhibiting a variety of different light transport effects in the scene being captured. For example, a "caustics" type scene generally includes a set of one or more transparent objects, where the light transport is dominated by caustics created by light refraction. In a "shadow" type scene, the geometry of one or more particular elements of the scene often results in complex occlusions that tend to produce detailed shadows. An "inter-reflection" type scene is designed to illustrate inter-reflections between different objects (such as, for example, reflective colored metallic balls) in combination with color bleeding effects. In a "combination" type scene, objects with different material properties are placed together and present a mixture of different light transport effects, including reflection, refraction, shadows, and inter-reflections, subsurface scattering, and caustics. In other words, it should be clear that the Scene Re-Lighter is capable of reconstructing a light transport matrix for scenes of any complexity, and including materials having any variety of light transport effects.

1.1 System Overview:

As noted above, the "Scene Re-Lighter," provides various techniques for automatically reconstructing a light transport matrix (i.e., matrix T) from a sparsely sampled set of images to provide various combinations of complex light transport effects in images. The processes summarized above are illustrated by the general system diagram of FIG. 1. In particular, the system diagram of FIG. 1 illustrates the interrelationships between program modules for implementing various embodiments of the Scene Re-Lighter, as described herein. Furthermore, while the system diagram of FIG. 1 illustrates a high-level view of various embodiments of the Scene Re-Lighter, FIG. 1 is not intended to provide an exhaustive or complete illustration of every possible embodiment of the Scene Re-Lighter as described throughout this document.

In addition, it should be noted that any boxes and interconnections between boxes that may be represented by broken or dashed lines in FIG. 1 represent alternate embodiments of the Scene Re-Lighter described herein, and that any or all of these alternate embodiments, as described below, may be used in combination with other alternate embodiments that are described throughout this document.

Figure 4:
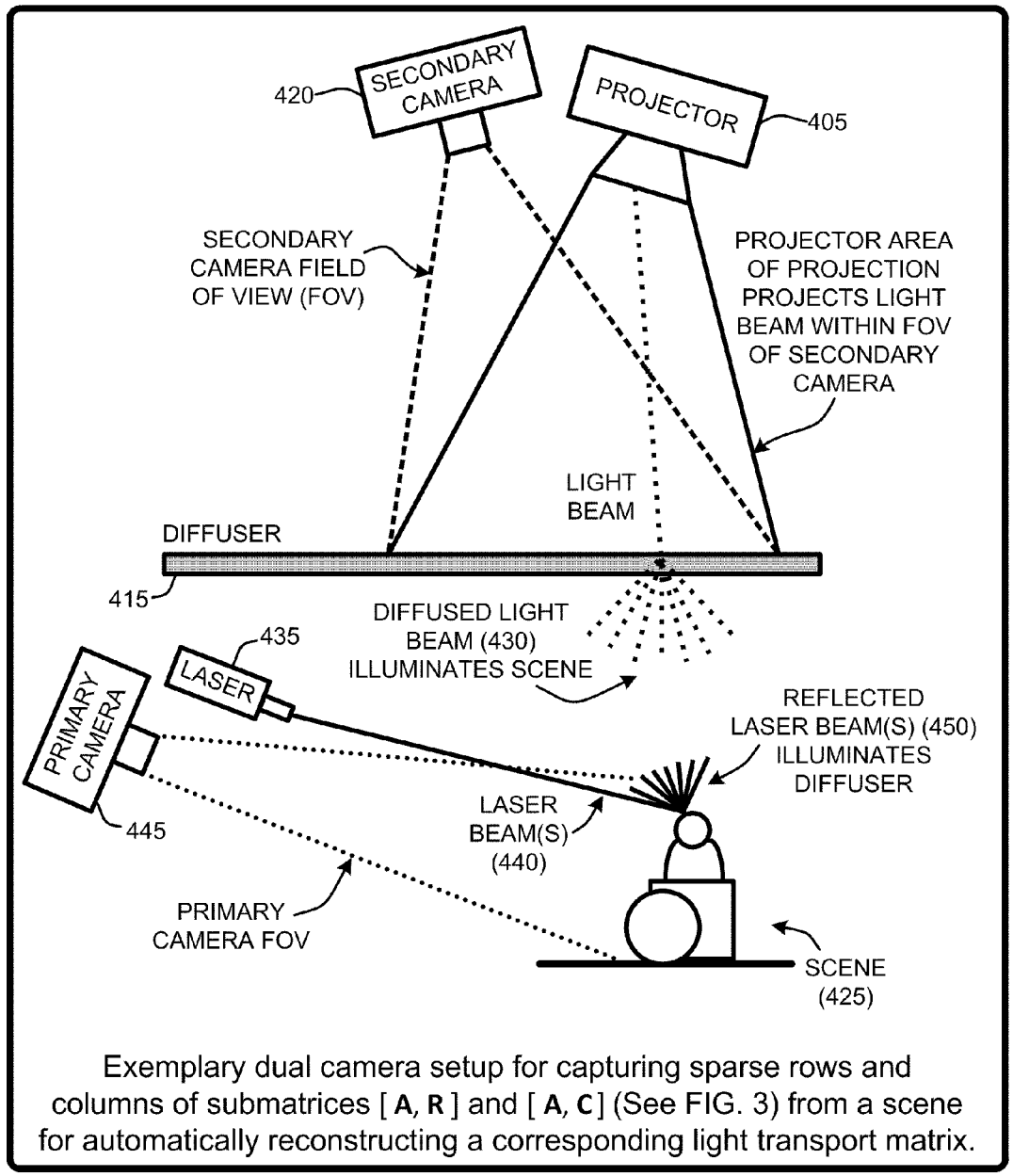
FIG. 4 provides an exemplary dual camera setup for capturing sparsely sampled rows and columns of comprising submatrices of a light transport matrix corresponding to a scene for use in automatically reconstructing a corresponding light transport matrix for that scene, as described herein.

As illustrated by FIG. 1, the processes enabled by the Scene Re-Lighter begin operation by optionally using a calibration module 100 to calibrate an image capture setup. One example of a tested embodiment of the image capture setup is illustrated by FIG. 4, as discussed in Section 2.4.1, however, it should be understood that as discussed throughout this document, the light transport matrix reconstruction techniques are not intended to be limited to use with the exemplary image capture setup described with respect to FIG. 4. In general, the calibration process provided by the calibration module 100 operates to calibrate the color and intensity of point light sources prior to capturing sparse rows and columns of the light transport matrix from a particular scene.

Actual sampling of a scene 105 begins by sampling a set of either rows or columns via the row sampling module 110 or the column sampling module 115. It is not important whether row sampling occurs prior to column sampling since equal numbers of row and column samples will be obtained either way. Note however, that in the case that different numbers of rows and columns are sampled, the Scene Re-Lighter will still successfully reconstruct the light transport matrix, as described herein.

More specifically, assuming for purposes of explanation that sampling begins with rows, the Scene Re-Lighter uses the row sampling module 110 to capture a set of one or more rows of the light transport matrix (see Section 2.4.3). Captured row samples are then added to a current sample set 120, which represents samples of submatrices A, C, and R of the light transport matrix (see discussion of FIG. 3). As soon as the row sampling module 110 completes row sampling, the column sampling module begins sampling columns of the light transport matrix (see Section 2.4.2). Captured column samples are then added to a current sample set 120. As noted above, the same number of rows and columns are generally captured in each sampling iteration (though this is not an explicit requirement).

Once a set of row and column samples have been obtained, the Scene Re-Lighter then evaluates these samples (i.e., submatrix A of the current sample set 120) via a light transport kernel estimation module 125. In general, as discussed in detail in Section 2.3, the light transport kernel is a nonlinear function, f, that is used to change the values of the entries in light transport matrix to address certain matrix rank assumptions that are described in Section 2.3. The light transport kernel estimation module 125 directly estimates the light transport kernel from submatrix A of the current sample set 120.

Once the light transport kernel has been estimated, a rank factor computation module 130 computes a "rank factor" of f(A) (see Section 2.3). The computed rank factor is then passed to a sufficiency check module 135 that compares the rank factor to a predetermined rank factor threshold value 140. If the computed rank factor is less than the rank factor threshold value 140, then the estimated light transport kernel f is determined to be sufficient 150. Otherwise, the Scene Re-Lighter returns to the capture stage to capture another set of rows and columns via the row sampling module 110 and the column sampling module 115. Note that the rank factor threshold value 140 can be fixed at some desired value, or can be input via a user interface 145 or the like.

The above described iterative process, i.e., capture rows and columns, estimate light transport kernel, compute and compare rank factor, repeat, continues until such time as sufficient samples have been captured that the rank factor is less than the rank factor threshold value 140. In general, as more samples are collected, the value of the estimated rank factor will decrease until such time as it is less than the predetermined threshold value. Once the rank factor is sufficient 150 (i.e., less than the predetermined rank factor threshold value 140, this means that the estimated light transport kernel is also sufficient and that a sufficient number of samples have been obtained to reconstruct the light transport matrix.

Therefore, once the computed rank factor is sufficient 150, the next step is to provide that estimated light transport kernel to a kernel mapping module 155 along with the submatrices A, C, and R of the current sample set. The kernel mapping module 155 then maps or transforms submatrices A, C, and R to their corresponding kernel mapped versions, i.e., f(A), f(C), and f(R). In other words, the kernel mapping module 155 outputs a kernel-mapped sample set 160 comprising f(A), f(C), and f(R).

The kernel-mapped sample set 160 is then provided to a "Kernel Nyström" reconstruction module 165 that approximates f(B) of a kernel version of the light transport matrix. As discussed in detail in Section 2.2, once f(B) has been approximated, it is combined with f(A), f(C), and f(R) to construct a kernel mapped light transport matrix 170, i.e., f(T). The actual light transport matrix T is then recovered by passing the kernel mapped light transport matrix 170 to an inverse kernel mapping module 175 that applies an inverse kernel mapping to the kernel mapped light transport matrix 170 to reconstruct the actual light transport matrix 180.

Finally, the light transport matrix 180 is used for a variety of purposes, including, for example, using a scene rendering module 185 for rendering images of the scene 105 under any desired point source lighting conditions and illumination colors.

2.0 Operational Details of the Scene Re-Lighter:

The above-described program modules are employed for implementing various embodiments of the Scene Re-Lighter. As summarized above, the Scene Re-Lighter provides various techniques for using an automatically reconstructed light transport matrix (i.e., matrix T) derived from a sparse sampling of images to provide various combinations of complex light transport effects in images, including caustics, complex occlusions, inter-reflections, subsurface scattering, etc. The following sections provide a detailed discussion of the operation of various embodiments of the Scene Re-Lighter, and of exemplary methods for implementing the program modules described in Section 1 with respect to FIG. 1. In particular, the following sections provides examples and operational details of various embodiments of the Scene Re-Lighter, including: the Nyström method; a kernel extension to the Nyström Method, Estimating the Light Transport Kernel f; adaptive light transport measurement; and use of a tested embodiment of the Scene Re-Lighter.

2.1 The Nyström Method:

The following paragraphs first review the generalized Nyström method for asymmetric matrices followed by an introduction of the "Kernel Nyström" method in Section 2.2. Note that the following discussion assumes that a sparse set of rows and columns of the light transport matrix is known. However, a discussion of an exemplary technique for capturing individual rows and columns from a real world scene is provided in Section 2.4.

Note that throughout the following discussion, the following notational convention is used: matrices are denoted by bold uppercase letters, e.g., "T", a vector is denoted by bold lowercase letters, e.g., "l", and a scalar or a scalar function is denoted by lowercase italic letters, e.g. "f". Given a matrix T, its element at row i and column j is denoted as $T_{ij}$, while f(T) denotes a matrix obtained by applying f to each element of the matrix T.

2.1.1 Asymmetric Generalization of the Nyström Method:

The conventional Nyström method reconstructs a low rank symmetric matrix from sparsely sampled columns. As shown in the PRIOR ART FIG. 2, an unknown (n+k)×(n+k) symmetric matrix T with k sampled rows [$AC^T$] can be approximated as illustrated by Equation (2):

$$T = \begin{bmatrix} A & C^T \\ C & B \end{bmatrix} \approx \begin{bmatrix} A & C^T \\ C & CA^{-1}C^T \end{bmatrix} \quad \text{Equation (2)}$$

The reconstruction is accurate when the symmetric matrix T has a rank d≦k, except that the sampled rows [AC$^T$] are of a rank smaller than d.

Figure 2:
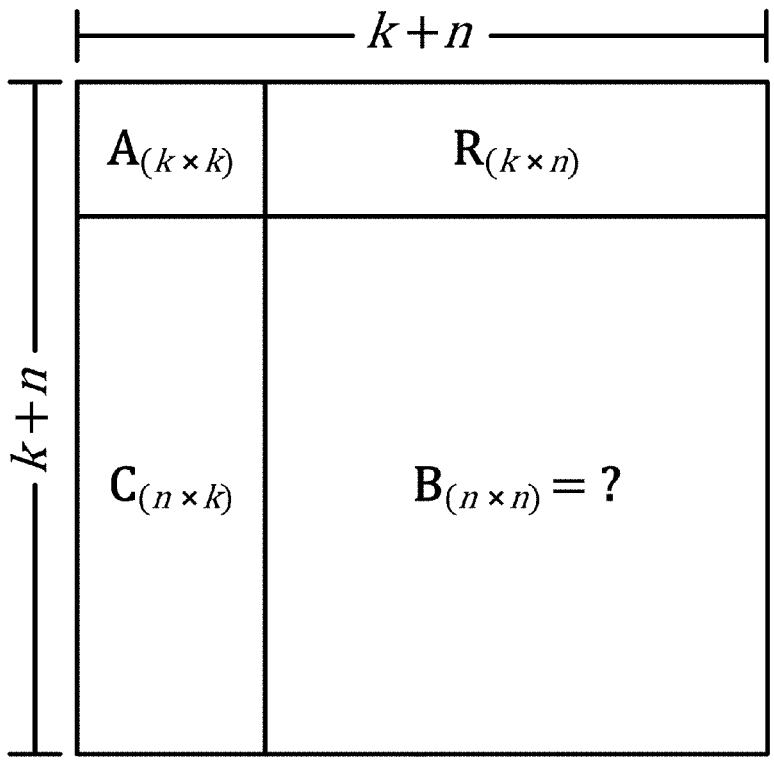
FIG. 2 provides a PRIOR ART illustration of the conventional Nyström process for reconstructing a symmetric matrix from sparsely sampled rows and columns of the matrix, as described herein FIG. 3 provides an illustration of a "Kernel Nyström" process for reconstructing a light transport matrix from sparsely sampled rows and columns transformed via a "light transport kernel" that is automatically estimated from sampled images of a scene, as described herein.

In other words, as illustrated by PRIOR ART FIG. 2, assuming the conventional Nyström process, submatrix [A, R] (i.e., sparsely sampled rows) and Submatrix [A, C] (i.e., sparsely sampled columns) are processed using the conventional Nyström process to reconstruct submatrix B, which is then used to reconstruct the entire matrix. In other words, the conventional Nyström process approximates submatrix B by the matrix multiplications of C, R, and the pseudo-inverse of A (i.e., A$^+$), where B≈C·A$^+$·R, to reconstruct the entire symmetric matrix.

In contrast, for asymmetric light transport matrices in which the image pixels (columns) and light sources (rows) are sampled in different spaces, a generalized Nyström method can be applied for reconstruction. As illustrated in FIG. 3, it is assumed that r rows [AR] and c columns [A$^T$C$^T$]$^T$ are known out of an (r+m)×(c+n) asymmetric matrix T. If the rank of T is equal to the rank of A, i.e., d=rank(T)=rank(A), then the following relationship can be expected:

$$[C \quad B] = P[A \quad R] \text{ and } \begin{bmatrix} R \\ B \end{bmatrix} = \begin{bmatrix} A \\ C \end{bmatrix} Q \quad \text{Equation (3)}$$

where P and Q are matrices of appropriate sizes, which implies that C=PA, R=AQ and B=PR=CQ. Thus the missing portion B in the matrix T can be reconstructed as:

$$B = PAQ = PAA^+AQ = CA^+R, \quad \text{Equation (4)}$$

where A$^+$ denotes the Moore-Penrose pseudoinverse of A, which has the property AA$^+$A=A. So the reconstruction is:

$$T = \begin{bmatrix} A & R \\ C & CA^+R \end{bmatrix} \quad \text{Equation (5)}$$

In other words, as illustrated by FIG. 3, submatrix [A, R] (i.e., sparsely sampled rows) and submatrix [A, C] (i.e., sparsely sampled columns) are automatically constructed using an automated image capture process (See Section 2.2). Missing submatrix B is reconstructed by the "Scene Re-Lighter" using a "Kernel Nyström" process that ultimately results in reconstruction of the light transport matrix T from submatrices A, R, C and B. In other words, using an automatically estimated light transport kernel f, the "Kernel Nyström" process approximates f(B) by the matrix multiplications of f(C), f(R), and the pseudo-inverse of f(A), where f(B)≈f(C)·f(A)$^+$·f(R). Submatrix B is then obtained using the inverse of the light transport kernel (i.e., f$^{-1}$). The final light transport matrix T is then constructed from submatrices A, R, C and B Note that in the case that (r+m)=(c+n), the matrix T is symmetric, otherwise, the matrix T is asymmetric. The "Scene Re-Lighter" is fully capable of handling either case given the extension to the Nyström process described above.

Comparing Equation (2) and Equation (5), it can be seen that the traditional Nyström method is a specific case of the generalized Nyström method when R≡C$^T$.

To compute the Moore-Penrose pseudoinverse of A, the singular value decomposition (SVD) is applied to A to obtain:

$$A = U_A \Sigma_A V_A^T \quad \text{Equation (6)}$$

where U$_A$, Σ$_A$ and V$_A^T$ are of sizes r×d, d×d and d×c, respectively, and the columns of U$_A$ and V$_A$ are orthonormal: U$_A^T$U$_A$=I and V$_A^T$V$_A$=I. The matrix A$^+$ is then computed as:

$$A^+ = V_A \Sigma_A^{-1} U_A^T \quad \text{Equation (7)}$$

Then, having computed A$^+$, the light transport matrix T can be reconstructed using Equation (5).

2.2 Kernel Extension to the Nyström Method:

Both the traditional and the generalized Nyström methods discussed above in Section 2.1.1 rely on the assumption that the ranks of T and A are identical in order to achieve an exact reconstruction. In reality, this assumption may be violated, resulting in some reconstruction error. One way to make the Nyström method more effective is to apply a transformation to the entries in the matrix so that this low rank assumption is better satisfied, thereby minimizing the reconstruction error. Note that since linear transforms do not change the rank of a matrix, nonlinear transforms are necessary to better satisfy the low rank assumption.

In the machine learning literature, the well-known "kernel trick" is a standard approach for enhancing the performance of algorithms based on nonlinear transformations of the input data. In general, the kernel trick involves mapping vectors in the data space to a (usually) higher dimensional feature space. Then, the same procedures of the original algorithm done in the data space are transferred to the feature space. The key to the success of the kernel trick is that the mapping function need not be explicitly specified. Rather, a kernel function is sufficient for computing the inner products in the feature space.

Expanding upon the idea of the aforementioned kernel trick, the Scene Re-Lighter uses a nonlinear function f to change the values of the entries in light transport matrix T, such that the rank assumption can be better fulfilled, i.e., the rank of f(T) is as close to that of f(A) as possible. This nonlinear function f is referred to herein as a "light transport kernel." After reconstructing f(T) using the generalized Nyström method, i.e.:

$$f(T) \approx K = \begin{bmatrix} f(A) & f(R) \\ f(C) & f(C)(f(A))^+ f(R) \end{bmatrix} \quad \text{Equation (8)}$$

the original T can be recovered by an inverse mapping with f$^{-1}$:T≈f$^{-1}$(K).

To see that the above nonlinear mapping process is an example of the kernel method, T can be regarded as an inner product matrix, as illustrated by Equation (9), where:

$$T_{ij} = \phi_i \cdot \psi_j \quad \text{Equation (9)}$$

where {φ$_i$} and {ψ$_j$} are two different point sets in a particular space. Note that as shown below, it is not necessary to specify what these two point sets are. This differs from the traditional kernel method that requires {φ$_i$} and {ψ$_j$} to be identical. Note that different point sets are used when T is asymmetric, as with most light transport matrices. The kernel method then uses an implicit mapping "Γ" to map the point sets to another space. Then the kernel matrix K in the mapped space, a.k.a. the inner product matrix of the mapped point sets, is given by Equation (10), where:

$$K_{ij} = \Gamma(\phi_i) \cdot \Gamma(\psi_j) \quad \text{Equation (10)}$$

Then, to compute K, an explicit kernel function g is prepared such that $g(\phi_i, \psi_j) = \Gamma(\phi_i) \cdot \Gamma(\psi_j)$, rather than explicitly specifying $\Gamma$, which is much more difficult. One of the most frequently used kernel functions is the polynomial kernel: $g(\phi_i, \psi_j) = (1 + \phi_i \cdot \psi_j)^p$. So, for purposes of explanation, the kernel g is also chosen in such a form: $g(\phi_i, \psi_j) = f(\phi_i \cdot \psi_j)$. Given this choice of the kernel function:

$$K_{ij} = f(\phi_i \cdot \psi_j) = f(T_{ij}) \text{ i.e., } K = f(T) \quad \text{Equation (11)}$$

2.3 Estimating the Light Transport Kernel f:

To enable the Kernel Nyström method described herein, it is necessary to select, specify, or estimate the light transport kernel f. However, as the space of all monotonic smooth functions is of infinite dimension, the form of the light transport kernel f is assumed in order to narrow down the search space. While it should be clear that any of a number of such functions can be used, for purposes of explanation, the following discussion assumes that f is a simple power function in the form of $f(x) = x^\gamma$ (i.e., a simple gamma function), as this family of functions has only one variable parameter (i.e., $\gamma$) and hence an optimal function of this form is relatively easy to find. Moreover, experimentation using various tested embodiments of the Scene Re-Lighter has demonstrated that such a choice of the light transport kernel generally produces a greatly enhanced reconstruction performance. However, it must be understood that the Scene Re-Lighter is not intended to be limited to the specific form of the light transport kernel functions described herein, and that other forms of the light transport kernel function may be used, if desired.

As discussed above, to reduce the reconstruction error, the rank of f(T) could be transformed to be as close to that of f(A) as possible (see discussion associated with Equation (3) above). However, since complete information regarding T is not available, the real rank of f(T) is actually unknown, and thus transforming the rank of f(T) to match that of f(A) is problematic. Therefore, to address this issue, the Scene Re-Lighter instead operates to minimize the rank of f(A) rather than transforming the rank of f(T) to be as close as possible to that of f(A). The underlying idea here is that if the rank of f(A) is much less than min(r,c), then it is very likely that the rank of f(T) does not exceed min(r,c). Therefore, the generalized Kernel Nyström method described herein can be effective. This leads to a rank minimization problem that is usually formalized as minimizing the nuclear norm of a matrix.

Specifically, the basic idea is to find a light transport kernel f that minimizes the rank factor, $e_r$, where:

$$e_r = \frac{Pf(A)P_*}{Pf(A)P_2} \quad \text{Equation (12)}$$

where the nuclear norm is defined as $PXP_* = \Sigma_i \sigma_i$, the spectral norm is defined as $$PXP_2 = \max_i \{\sigma_i\}$$

and $\sigma_i$'s are the singular values of the matrix X. Note that here the nuclear norm is normalized using the largest singular value to avoid reducing the rank by mapping the entries to be close to zeros (which corresponds to a small $Pf(A)P_2$). Rather, it is desired to reduce the rank of f(A) by enhancing linear coherence of the rows/columns of f(A).

It is easy to see that mapping all the entries to a constant can trivially reduce the rank of f(A) to 1 or even 0. However, such a trivial mapping causes a problem in inverting from K to T by using the inverse function $f^{-1}$. Therefore, to reduce the reconstruction error, the Scene Re-Lighter takes the further step of ensuring that the inversion is numerically robust. The robustness of inversion can be measured by the slope of $f^{-1}$: the steeper $f^{-1}$ is, the less robust the inversion is. This is addressed by further minimizing $e_s$, where:

$$e_s = \int_0^1 (f^{-1})'(x) p(x) dx = \int_0^1 \frac{1}{f'(x)} p(x) dx \quad \text{Equation (13)}$$

where the identity $$(f^{-1})'(x) = \frac{1}{f'(x)}$$

is used and p(x) is the distribution density of the values in A, which is estimated from the histogram of entry values of A. p(x) is assumed to be identical to that in T, due to the random sampling of A from T. Further, the slope of $f^{-1}$ is weighted by p(x) in order to achieve an overall robustness for all entry values in T.

Combining the above two criteria, the Scene Re-Lighter selects the light transport kernel function f whose parameter $\gamma$ minimizes the objective function:

$$g(\gamma) = e_r \cdot e_s = \frac{Pf(A)P_*}{Pf(A)P_2} \int_0^1 \frac{1}{f'(x)} p(x) dx. \quad \text{Equation (14)}$$

A "golden section search" is then used to search for the optimal $\gamma$ within [0.001, 1000] in logarithmic space. As A is of a relatively small size (r×c), this optimization takes only a few seconds using a conventional desktop type computer or the like.

In summary, given the matrices of sampled rows and columns (A, C, and R), the "Kernel Nyström" method works as follows:
1. Estimate the light transport kernel f from A;
2. Map matrices of sparse samples to their kernel version f(A), f(C), and f(R) respectively;
3. Apply the Nyström method to reconstruct the kernel light transport matrix K=f(T) with the Moore-Penrose pseudoinverse of f(A) using Equation (5);
4. Obtain the light transport matrix T via the inverse kernel mapping $T = f^{-1}(K)$.

2.4 Adaptive Light Transport Measurement:

The Kernel Nyström method processes a sparse set of rows and columns of the light transport matrix as input for reconstruction. However, without any knowledge about the light transport in the scene, it is difficult to determine the sample number in advance. To address this issue, in various embodiments, the Scene Re-Lighter uses an automated adaptive process to capture sparse rows and columns from the scene, where the actual number of row and column samples is automatically determined from the captured data.

As shown in the image capture pseudo-code provided in Table 1, after a batch of rows and columns is sampled from the scene, the Scene Re-Lighter estimates the light transport kernel f from the matrix A of the current sample set and computes the rank factor $e_r$ of f(A) using Equation (12). For a sample set that has r rows and c columns, if $e_r/\min(r,c)$ is smaller than a pre-defined threshold, E, the rank of f(A) is much less than min(r,c). Based on the same rationale described above with respect to kernel estimation, it is very likely the rank of f(T) does not exceed min(r,c). Therefore, in this case, the sampled data are sufficient for reconstructing f(T) and the capturing is finished. Otherwise, if $e_r$/min(r,c) is not smaller than the pre-defined threshold, $\epsilon$, the Scene Re-Lighter captures a new batch of rows and columns and repeats the above steps with the extended sample set until such time as $e_r$/min(r,c) is smaller than a pre-defined threshold, $\epsilon$. Note that in various embodiments, image capture can also be terminated after a predetermined or user specified number of image capture iterations have been performed, though in this case, light transport accuracy may be reduced since it will be likely that $e_r$/min(r,c) is not smaller than the pre-defined threshold, $\epsilon$.

In general, the Scene Re-Lighter focuses on the light transport from point light sources on a 2D plane to image pixels captured from a fixed view point. More specifically, a column of the light transport matrix is directly obtained from the image of the scene under a virtual point light source, while a row of the matrix is measured via a dual camera setup by exploiting the reciprocity of light transport. To obtain a batch of rows and columns, the Scene Re-Lighter first captures the columns and then acquires the rows of the light transport matrix. A stratified sampling scheme is applied for sampling rows of the matrix based on sparsely sampled column values.

TABLE 1

Pseudo-Code for Automated Adaptive Image Capture

```
AdaptiveCapture( r', c', ε )
    finished = true
    capture r' rows and c' columns of scene
    add samples to sample set
    update matrix A (i.e., matrix of current sample set)
    r = r'; c = c'
    While (finished == true)
        estimate light transport kernel f from matrix A
        estimate rank factor e_r of f(A)
        If ( e_r/min(r,c) < ε )
            finished = true
        Else
            capture r' rows and c' columns of scene
            add samples to sample set
            update matrix A
            r = r + r'; c = c + c'
```

Clearly, there are many ways in which images can be captured to acquire the row and column data used by the Scene Re-Lighter. For purposes of explanation, one such device setup for acquiring batches of row and column samples from the scene is described below with respect to FIG. 4, as discussed in Section 2.4.1.

2.4.1 Device Setup and Calibration:

In general, as explained above, the Scene Re-Lighter reconstructs the light transport matrix from sparsely sampled submatrices (see discussion of FIG. 2 and FIG. 3). More specifically, as discussed above, Submatrix [A, R] (i.e., sparsely sampled rows) and Submatrix $[A^T, C^T]^T$ (i.e., sparsely sampled columns) are automatically constructed using an automated image capture process such as the camera setup illustrated by FIG. 4. The missing submatrix B is then reconstructed by the "Scene Re-Lighter" using the "Kernel Nyström" process for reconstruction of the light transport matrix T from matrices A, R, C and B. FIG. 4 illustrates one of many ways in which the Submatrix [A, R] and Submatrix $[A^T, C^T]$T are populated.

In particular, in a tested embodiment of the Scene Re-Lighter, as shown in FIG. 4, a projector 405 is positioned to project a light beam 410 of a desired pixel size onto specific points on a diffuser 415 within the field of view (FOV) of a secondary camera 420. As discussed in further detail below, the diffuser 415 is positioned above a scene 425, and is assumed to provide diffuse and spatially uniform reflection and refraction. The light beam 410 from the projector 405 produces a diffused light beam 430 when it strikes the diffuser 415. This diffused light beam then illuminates some or all of the scene 425.

In addition, a laser 435 that can generate a laser of a desired color in the RGB color space (or a laser beam in some other color space, such as CMYK, if desired) is positioned to project a laser beam 440 to illuminate the scene 425 within the FOV of a primary camera 445. This laser beam 440 is reflected 450 to illuminate the diffuser 415, with images of the laser illuminated diffuser then being captured by the secondary camera, as discussed in Section 2.4.3. Note that separate lasers generating individual colors (e.g., separate red, blue and green lasers) can also be used if desired. However, in this case, separate images will need to be captured with each color laser and then combined to produce an image having the desired illumination color.

When the projector 405 shoots a light beam 410 (e.g., 5×5 pixels in a tested embodiment, though light beam size can be set to any desired size) onto a point of the diffuser 415, partial light is refracted from the other side of the paper and illuminates the scene as a point light source. In other words, the diffused light beam 430 acts as a point light source originating at the point where the light beam 410 from the projector 405 strikes the diffuser. By moving the light beam 410 to different points across the diffuser, different point light sources can be modeled. More specifically, given the above-described setup, the Scene Re-Lighter models the light transport from the point light sources that correspond to all projector pixels (i.e., all possible shifts of 5×5 pixels—or different shifts, depending upon the light beam size) to image pixels captured by the primary camera 445. Note that the modeled light transport is represented by a very large light transport matrix with approximately one million columns and rows (note that actual matrix size can scale with the resolution settings of the cameras).

In a tested embodiment of the Scene Re-Lighter, before the image capture process begins, the Scene Re-Lighter calibrates the color and intensity of each point light source prior to placing objects comprising the scene under the diffuser. For example, calibration is first performed on the point light sources sampled on 40×40 regular grids (or any other desired grid size) by capturing the images of the diffuser plane lit with each of a set of point light sources by using the projector to illuminate specific positions of the diffuser. In a tested embodiment, 1600 separate point light sources were used to illuminate the diffuser, though the actual number of point light sources can be any number desired, with the understanding that reconstruction accuracy improves as more data is captured. The images of the diffuser plane are captured using the secondary camera simultaneously with each separate illumination to build a correspondence between the point light source positions and pixels of the secondary camera image. Note that in the case that the projector resolution is less than the camera resolution, the images captured by the secondary camera are downsampled to match the projector's resolution. The other point light sources within the regular grid are then calibrated by interpolating the calibration results of neighboring point light sources on the grid.

Note that this calibration process enables the Scene Re-Lighter to model the light transport of the overall image capture setup in the absence of a scene (i.e., no objects comprising the scene are placed under the diffuser during calibration). In other words, as noted above, the calibration process is used to calibrates the color and intensity of each point light source (i.e., the movable projector beam) prior to placing objects comprising the scene under the diffuser to ensure consistency of both color and intensity. Any inconsistencies in the point light sources corresponding to a projected light beam at various locations can then be corrected by weighting or transforming color or intensity values at particular locations of the diffuser to ensure consistency in those point light sources.

2.4.2 Column Sampling Using the Primary Camera:

After the initial calibration process described in Section 2.4.1, the scene objects are placed into some desired arrangement under a portion of the diffuser plane that is within the FOV of the secondary camera. The Scene Re-Lighter then begins to capture columns of the light transport matrix with the primary camera, with the scene being illuminated by the light beam from the projector being projected onto different positions of the diffuser (note the positions are random or selected by some other statistical process) to create different point light sources, as described above. In particular, without any prior knowledge on the light transport in the scene, a set of "columns" of the light transport is acquired using the primary camera with r point light sources uniformly or randomly distributed on the diffuser plane. For each sampled point light source $l_j$, multiple images of different exposures are taken from the primary camera and then down-sampled and fused into HDR images (i.e., high dynamic range images). In a tested embodiment, eight different exposure settings were used, though any other number of different exposure settings can be used, if desired. The result is a set of column vectors $T_{\cdot,j}$ of the light transport matrix T.

In other words, a column of the light transport is the transport from one light source to all image pixels. The Scene Re-Lighter projects a small spot on the diffuser to simulate a point light source at the desired position. The scene will then be illuminated by the point light source, and a photo of the scene is captured by the primary camera. Note that when sampling columns, the primary camera captures the entire image (same FOV for every image) at multiple exposures while moving the point light source from the projector to different positions on the diffuser, with the specific positions being recorded for use in the row sampling and matrix reconstruction described below.

2.4.3 Row Sampling Using the Secondary Camera:

As noted above, assuming an RGB color space, the dual camera setup described with respect to FIG. 4 includes the three laser emitters (or single tunable laser emitter capable of specific colors), with the secondary camera being used for row sampling. In particular, the laser emitters are placed close to the primary camera (or in the exact same position as the primary camera if the primary camera is first moved out of the way for this process), their orientations being controlled by a computer to ensure accuracy in placement. Following each placement, the scene is then illuminated by the laser beams. The reflectance of the scene is then projected onto the diffuser, refracted uniformly on the other side of the diffuser, and recorded by the secondary camera neighboring the projector.

Note also that a single laser capable of emitting separate color lasers within the color space (e.g., RGB, CMYK, etc.) or even focused point light sources can be used in place of multiple laser emitters. In other words, the laser beam originates from approximately the same viewpoint as the primary camera. However, overall results in light transport matrix reconstruction can be improved by putting the laser or lasers in exactly same position as camera, with all lasers shining at the same time (RGB) or shining separately then capturing three separate images. Further, other color spaces (e.g., CMYK) can be used by calibrating the lasers to any desired color space. However, for purposes of explanation, the laser emitters will be described as being represented by three separate lasers, each emitting in one color of an RGB color space.

The Scene Re-Lighter then utilizes the sampled column values (see Section 2.4.2) to guide the row sampling. In particular, the Scene Re-Lighter packs the r sparse elements in each row to a vector $r_i=(T_{i,j_1},T_{i,j_2},\ldots,T_{i,j_r})$, where $j_1,\ldots,j_r$ are indices of the sampled columns. The Scene Re-Lighter then employs k-means (or other conventional clustering technique) to cluster the $\{r_i\}$ into r clusters. For each cluster, the vector closest to the cluster center vector is selected as a "sampling pixel" location.

For each row (i.e., pixel location) to be sampled, the Scene Re-Lighter adjusts the direction of three laser beams so that they focus on the same surface point whose projection on the primary camera falls in the sampled pixel position. Note that by positioning the primary camera and the laser emitters relatively far away from the scene, any angle difference between the camera's pixel ray and the laser beams is sufficiently small that it can be ignored in capturing without significantly reducing the reconstruction accuracy of the light transport matrix. An HDR image of the diffuse plane is then acquired from the secondary camera. With the correspondence between the secondary camera pixels and the point light source positions, it is easy to obtain the sampled row values from the downsampled HDR images. This process is then repeated until all sampled rows are measured. Finally, the sampled columns are scaled so that the matrix element values captured by both rows and columns are the same.

In other words, a row of the light transport is the transport from all light sources to a single image pixel of the primary camera. By exploiting reciprocity, the rows are measured by an inverse light path by shooting a laser beam at the pixel of the scene (in the field of view of the primary camera) that the row corresponds to. Reflected light from the scene then projects a corresponding image on the diffuser that is then captured by the secondary camera. As noted above, when sampling columns, the entire image of the scene is captured from the primary camera while moving the point light source from the projector to random positions. In contrast, when sampling rows, the Scene Re-Lighter is sampling individual pixels using the secondary camera by capturing pixels on the diffuser.

2.5 Use of a Tested Embodiment of the Scene Re-Lighter:

In a tested embodiment of the Scene Re-Lighter, a batch of 10 rows and 10 columns is captured in each adaptive capture step (see algorithm in Table 1), with the threshold set as $\epsilon=0.05$. Note that the number of rows/columns captured in each iteration can be set to any desired value, though samples on the order of about 10 were found to provide good results (with the number of rows and columns being equal). Further, the error threshold, $\epsilon$, can also be set to any desired value, though lower values tend to produce higher accuracy in light transport matrix reconstruction.

A typical acquisition session (including image acquisition, HDR reconstruction, and kernel estimation) takes about two hours using a typical PC-type desktop computer minutes for capturing 150 rows and 150 columns from the scene. In a tested embodiment, the image resolution of both the primary and secondary camera was set to 1752×1168, while the light sampling resolution was set to 1024×768 due to resolution limitations of the projector. Again, it must be understood that the techniques described herein are not limited to any particular resolution or to any specific image capture or projection hardware or devices.

To reconstruct the light transport matrix for relighting, the sampled matrices (C, R, A and A⁺) are stored and used to reconstruct all rows of the light transport matrix using the Kernel Nyström method described above. Using the same PC-type desktop computer, the sampled matrices are processed in less than about 5 minutes to estimate the light transport kernel and reconstruct all rows of the light transport matrix of the scene.

Finally, given the reconstructed light transport matrix, an image of the scene can be automatically rendered directly from that light transport matrix using any desired point light source and/or illumination color.

Figure 5:
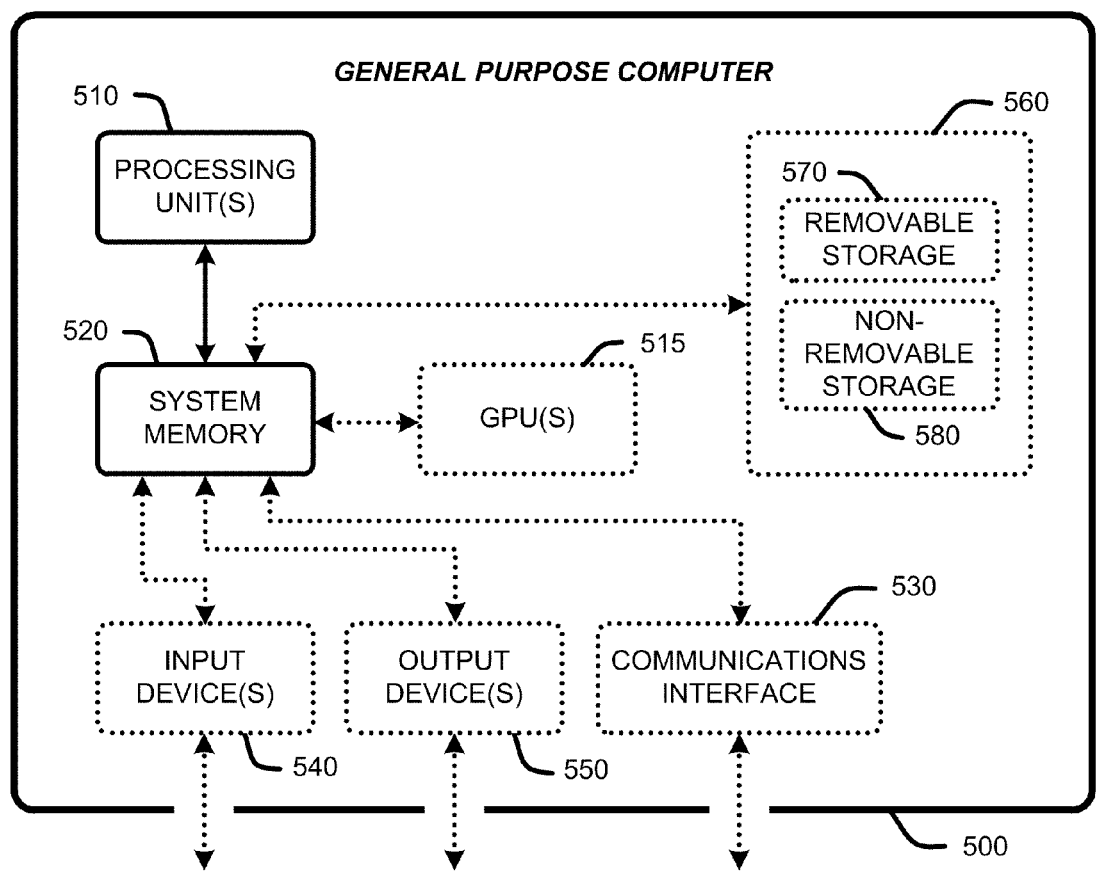
FIG. 5 is a general system diagram depicting a simplified general-purpose computing device having simplified computing and I/O capabilities for use in implementing various embodiments of the Scene Re-Lighter, as described herein.

3.0 Exemplary Operating Environments:

The Scene Re-Lighter described herein is operational within numerous types of general purpose or special purpose computing system environments or configurations. FIG. 5 illustrates a simplified example of a general-purpose computer system on which various embodiments and elements of the Scene Re-Lighter, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Such computing devices can be typically found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

To allow a device to implement the Scene Re-Lighter, the device should have a sufficient computational capability and system memory. In particular, as illustrated by FIG. 5, the computational capability is generally illustrated by one or more processing unit(s) 510, and may also include one or more GPUs 515, either or both in communication with system memory 520. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540. The simplified computing device of FIG. 5 may also include other optional components, such as, for example, one or more conventional computer output devices 550. Finally, the simplified computing device of FIG. 5 may also include storage 560 that is either removable 570 and/or non-removable 580. Such storage includes computer readable media or storage devices including, but not limited to, DVD's, CD's, floppy disks, tape drives, hard drives, optical drives, solid state memory devices, etc. Further, software embodying the some or all of the various embodiments, or portions thereof, may be stored on any desired combination of computer readable media in the form of computer executable instructions, software programs, etc. Note that typical communications interfaces 530, input devices 540, output devices 550, and storage devices 560 for general-purpose computers are well known to those skilled in the art, and will not be described in detail herein.

The foregoing description of the Scene Re-Lighter has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Scene Re-Lighter. It is intended that the scope of the invention be limited not by this detailed description, but rather by the claims appended hereto.

What is claimed is:

1. A method for constructing a light transport matrix for a scene, comprising steps for:
   acquiring a sparse sampling of rows and columns of a light transport matrix of a scene and adding the acquired samples to a current data set;
   estimating a kernel function from the current data set, wherein said kernel function is a nonlinear function for transforming values of the current data set to reduce a rank of the light transport matrix;
   applying the kernel function to the current data set to produce a set of transformed values comprising a sparsely sampled transformed light transport matrix;
   applying a Nyström process to the sparsely sampled transformed light transport matrix to reconstruct a complete transformed light transport matrix; and
   applying an inverse of the kernel function to the complete transformed light transport matrix to generate a complete light transport matrix of the scene.

2. The method of claim 1 wherein estimating the kernel function from the sparse sampling of rows and columns further comprises steps for:
   computing a rank factor from a submatrix of the sparsely sampled transformed light transport matrix;
   comparing the rank factor to a predetermined threshold value; and
   until the rank factor is less than the predetermined threshold value, repeating the steps for:
      acquiring a sparse sampling of rows and columns of the light transport matrix of the scene and adding the acquired samples to the current data set,
      estimating the kernel function from the current data set, and
      applying the kernel function to the current data set to produce the set of transformed values comprising the sparsely sampled transformed light transport matrix.

3. The method of claim 1 wherein the kernel function (f) is a gamma function in the form of $f(x)=x^\gamma$.

4. The method of claim 1 wherein estimating the kernel function from the current data set further comprises steps for automatically estimating the kernel function that will minimize a rank of a submatrix of the sparsely sampled transformed light transport matrix.

5. The method of claim 4 wherein the minimization of the rank of the submatrix is constrained by ensuring that an inversion of the estimated kernal function is numerically robust, as measured by the slope of the inverse of the kernal function, wherein steeper slopes indicate less numerically robust inversions.

6. The method of claim 1 further comprising steps for rendering the scene from the complete light transport matrix of the scene.

7. The method of claim 6 further comprising a user interface for specifying one or more point light source positions corresponding to entries in the complete light transport matrix of the scene.

8. The method of claim 1 wherein acquiring the sparse sampling of rows and columns of a light transport matrix of the scene comprises steps for:
- capturing images of a scene using a primary camera, said scene being lit by projecting a light beam onto random positions on a diffuser above the scene; and
- capturing images of the diffuser, said diffuser being illuminated by one or more laser beams reflected onto the diffuser from the scene.

9. A system for generating a light transport matrix for a scene from a sparse set of images of the scene, comprising:
- one or more cameras for acquiring a set of images representing a sparse sampling of rows and columns of a light transport matrix of a scene;
- a device for adding the acquired images to a current data set;
- a device for estimating a kernel function from the current data set, wherein the kernel function is a nonlinear function for transforming values of the current data set to reduce a rank of the light transport matrix;
- a device for applying the kernel function to the current data set to produce a set of transformed values comprising a sparsely sampled transformed light transport matrix;
- a device for applying a Nyström process to the sparsely sampled transformed light transport matrix to reconstruct a complete transformed light transport matrix; and
- a device for applying an inverse of the kernel function to the complete transformed light transport matrix to generate a complete light transport matrix of the scene.

10. The system of claim 9 wherein estimating the kernel function from the sparse sampling of rows and columns further comprises:
- computing a rank factor from a submatrix of the sparsely sampled transformed light transport matrix;
- comparing the rank factor to a predetermined threshold value; and
- until the rank factor is less than the predetermined threshold value, repeating the steps for:
  - acquiring a sparse sampling of rows and columns of the light transport matrix of the scene and adding the acquired samples to the current data set,
  - estimating the kernel function from the current data set, and
  - applying the kernel function to the current data set to produce the set of transformed values comprising the sparsely sampled transformed light transport matrix.

11. The system of claim 9 wherein the kernel function (f) is a gamma function in the form of $f(x)=x^\gamma$.

12. The system of claim 9 wherein estimating the kernel function from the current data set further comprises automatically estimating the kernel function that will minimize a rank of a submatrix of the sparsely sampled transformed light transport matrix.

13. The system of claim 12 wherein the minimization of the rank of the submatrix is constrained by ensuring that an inversion of the estimated kernal function is numerically robust, as measured by the slope of the inverse of the kernal function, wherein steeper slopes indicate less numerically robust inversions.

14. The system of claim 9 further comprising rendering the scene from the complete light transport matrix of the scene.

15. The system of claim 14 further comprising a user interface for specifying one or more point light source positions corresponding to entries in the complete light transport matrix of the scene.

16. A computer-readable medium device having computer executable instructions stored therein for generating a complete light transport matrix of a scene, said instructions causing a computing device to:
- acquire a set of images representing a sparse sampling of rows and columns of a light transport matrix of a scene;
- add the acquired samples to a current data set;
- estimate a kernel function from the current data set, wherein said kernel function is a nonlinear function for transforming values of the current data set to reduce a rank of the light transport matrix;
- apply the kernel function to the current data set to produce a set of transformed values comprising a sparsely sampled transformed light transport matrix;
- apply a Nyström process to the sparsely sampled transformed light transport matrix to reconstruct a complete transformed light transport matrix; and
- apply an inverse of the kernel function to the complete transformed light transport matrix to generate a complete light transport matrix of the scene.

17. The computer-readable medium of claim 16 wherein the kernel function (f) is a gamma function in the form of $f(x)=x^\gamma$.

18. The computer-readable medium of claim 16 wherein estimating the kernel function from the current data set further comprises automatically estimating the kernel function that will minimize a rank of a submatrix of the sparsely sampled transformed light transport matrix.

19. The computer-readable medium of claim 16 further comprising steps for rendering the scene from the complete light transport matrix of the scene, said rendering corresponding to a point light source position corresponding to an entry in the complete light transport matrix of the scene.

20. The method of claim 19 further comprising a user interface for specifying the point light source position.

* * * * *